INVENTOR
LEO KRAMER
BY
ATTORNEY

United States Patent Office 3,406,762
Patented Oct. 22, 1968

3,406,762
CONTROL APPARATUS FOR FLUID
POWERED TOOLS
Leo Kramer, Skillman, N.J., assignor to Ingersoll-Rand
Company, New York, N.Y., a corporation of New
Jersey
Filed May 12, 1967, Ser. No. 637,979
11 Claims. (Cl. 173—12)

ABSTRACT OF THE DISCLOSURE

A fluid powered tool having a normally open valve interposed in the fluid passage through which pressurized fluid is supplied to the motor of the tool. The normally open valve is constructed and arranged such that, during the operation of the tool, opposing surfaces of the normally open valve are subjected to pressurized fluid from the fluid passage. A normally closed pilot valve, adapted to be opened upon a predetermined operating condition of the tool, is provided for exhausting pressurized fluid from the normally open valve such that the latter is automatically closed in response to the occurrence of such predeterminal operating condition.

Background of the invention

The present invention relates to power operated tools and has more particular reference to the provision of a new and improved apparatus for controlling the operation of the fluid operated motor of a fluid powered tool, such as a pneumatic hand tool, in response to a predetermined operating condition of the tool.

Conventionally, numerous forms of devices have been provided for controlling the operation of a fluid powered tool, such as a pneumatic hand tool, in response to a predetermined operating condition of the tool. Many of these devices have included valving mechanisms which are constructed and arranged to shut off the flow of pressurized fluid to the motor of the tool in response to the occurrence of the predetermined operating condition. However, the valving mechanisms contained in these conventional devices generally have been capable of being actuated only by an actuating member or rod having a substantially stationary axis and, hence, have been incapable of actuation by an actuating member or rod having an axis which is moving in an annular path. In addition, the valving mechanisms of many of these conventional devices have been undesirably sensitive to mechanical vibrations and/or surges of the pressurized fluid; and the valving mechanisms of others of the conventional devices have been incapable of responding to a relatively small actuating force applied for a relatively limited period of time.

An object of the present invention is to provide a new and improved apparatus for shutting off the fluid operated motor of a fluid powered tool in response to a predetermined operating condition of the tool, which apparatus includes a valving mechanism particularly constructed and arranged to be actuated by an actuating member having an axis moving in an annular path.

Another object of the invention is to provide a new and improved apparatus of the type set forth including a valving mechanism which, although insensitive to fluid surges and/or mechanical variations, is capable of responding to a relatively small actuating force applied for a relatively limited period of time.

Another object is to provide a new and improved apparatus of the type set forth which, although relatively simple and economical in construction, is highly efficient and dependable in operation.

Summary of the invention

The aforegoing objects, and those other objects and advantages of the invention which will be apparent from the following description taken in connection with the accompanying drawings, are attained by the provision, in a fluid powered tool including a fluid operated motor and means for supplying pressurized fluid to the fluid operated motor, of an apperatus for controlling the operation of the fluid operated motor. This apparatus comprises a pilot operated valve means movable between an open position permitting the flow of pressurized fluid to the fluid operated motor and a closed position preventing the flow of pressurized fluid to the fluid operated motor. The pilot operated valve means is normally maintained in its open position; and a means is provided for causing the pilot operated valve means to be biased to its closed position. A chamber means is provided for causing pressurized fluid to oppose the aforementioned biasing means such that said pressurized fluid prevents the movement of the pilot operated valve means by the biasing means. A pilot valve means is provided for controlling the pressurized fluid opposing the biasing means, the pilot valve means comprising a plate member normally in a closed position wherein pressurized fluid is entrapped in said chamber means and movable to an open position wherein pressurized fluid is exhausted from said chamber means. A means, operable in response to a predetermined operating condition of the fluid powered tool, is provided for moving the plate member to its latter described position upon the occurrence of such predetermined operating condition.

Brief description of the drawings

Referring to the drawings.

Description of the preferred embodiments

Figure 1:
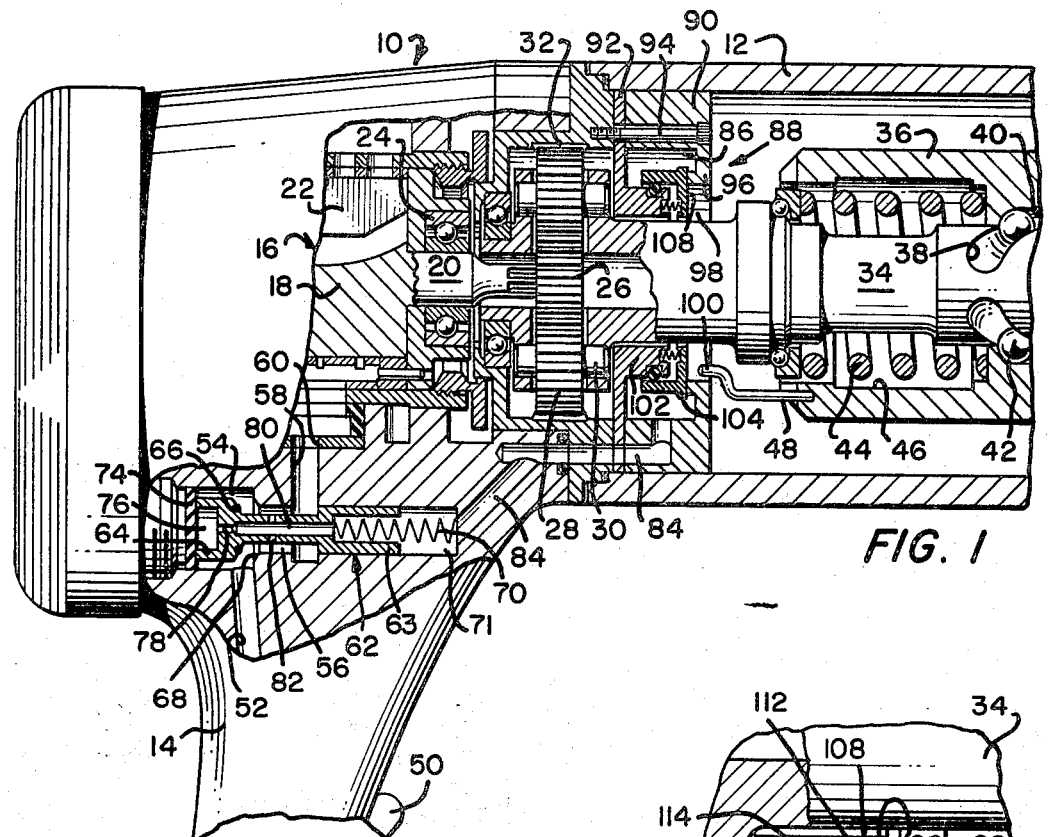
FIG. 1 is a fragmentary elevational view, partially broken away and in section, of a pneumatic hand tool including an embodiment of the present invention.

Referring more particularly to the drawings wherein similar reference characters designate corresponding parts throughout the several views, FIG. 1 illustrates a rotary impact tool or wrench designated generally as 10 which comprises a casing formed to include an elongated barrel 12 and a handle 14 depending from the barrel 12. The barrel 12 contains a vane type, pneumatically operated motor 16 which includes a rotor 18, a shaft 20 formed integrally with the rotor 18 and projecting from the opposing ends of the latter, and a plurality of vanes 22 carried by the rotor 18. The shaft 20 is rotatably journaled adjacent its opposing ends in bearings, one of which is shown as 24. The forward end of the shaft 20 is spline connected to a driving gear 26 which is in meshing engagement with a plurality of driven gears 28.

The driven gears 28 are rotatably mounted upon individual supporting pins 30 and are arranged in engagement with a stationary ring gear 32 which is rigidly supported by the barrel 12 circumferentially around the driven gears 28. The supporting pins 30 are rigidly mounted upon the rotatably mounted, spindle 34 of the tool 10 such that rotation of the driving gear 26 by the motor 16 provides conjoined rotation of the spindle 34. The gears 26, 28, and 32 thus, as will be understood, cooperate to provide an epicyclic or planetary gearing system for reducing the speed of the rotation transmitted to the spindle 34. The spindle 34 is suitably connected to an output spindle (not shown) carrying a conventional wrench socket (not shown) such that the rotation of the spindle 34 causes impact blows to be delivered to the output spindle in a conventional manner.

A hammer 36 circumferentially surrounds the spindle 34 in a fit suitable to permit rotation and axial movement of the hammer 36 relative to the spindle 34. The spindle 34 contains a plurality of circumferential, ball grooves 38 which, as shown in FIG. 1, each extend around the spindle 34 in both circumferential and axial directions. The hammer 36 contains a plurality of internal ball sockets 40, each communicating with one of the ball grooves 38, which contain balls 42 seated in the ball grooves 38. During the operation of the tool 10, the ball grooves 38 cooperate with the balls 42 to urge the hammer 36 axially on the spindle 34 and rotatably relative to the spindle 34. The length of each groove 38, as will be seen, serves to limit the relative movement of the hammer 36 on the spindle 34 in an axial direction. Thus, the amount of axial and rotational movement of the hammer 36 relative to the spindle 34 can be readily controlled during the formation of the ball grooves 38.

The hammer 36 is biased forwardly, that is, towards the output spindle driven by the spindle 34, by a helical spring 44 which is positioned circumferentially around the spindle 34 in a spring cavity 46 formed in the hammer 36. The forward end of the hammer 36, as conventional, is formed to include a pair of lugs or jaws, preferably located 180° from each other, which are adapted to engage a corresponding pair of lugs or jaws (not shown) connected to the output spindle. The hammer 36, furthermore, rigidly carries an elongated actuating member or rod 48 which projects rearwardly from the hammer 36 towards the motor 16. The rod 48, due to its rigid connection to the hammer 36, is axially movable with the hammer 36 and, during the rotation of the latter, moves in an annular path.

During the operation of the tool 10, and while the fastener driven by the output spindle is sufficiently loose to provide only relatively low resistance to the rotation of the output spindle, the hammer 36 rotatably drives the output spindle at the speed of the rotation of the spindle 34. However, when the fastener becomes sufficiently tightened to exert a higher, predetermined resistance on the output spindle, the ball grooves 38, the ball sockets 40, and the balls 42 cooperate to cause the hammer 36 to move rearwardly from the output spindle. When the hammer 36 is thus moved to a position wherein it is out of driving engagement with the output spindle, the spring 44 and the aforedescribed balls 42 cause the hammer 36 to move towards the output spindle and, thereby, cause impact blows to be delivered to the latter. As the hammer 36 delivers successive impact blows to the output spindle, it axially rebounds progressively increasing distances from the latter.

The present invention comprises the provision of a new and improved apparatus which is particularly constructed and arranged to shut off the flow of pressurized fluid to the motor 16 in response to the movement of the hammer 36 through a predetermined axial distance regardless of the position of the rod 48 in its annular path. A description of the construction of the embodiment of this apparatus illustrated in FIGS. 1 and 2 hereinafter follows wherein, as it is directly connected to the fluid passages supplying pressurized fluid to the motor 16, it has been described in conjunction with such fluid passages.

The trigger 50 of the tool 10 controls the flow of pressurized fluid through an inlet passage 52 which communicates through an inlet cavity 54 with a cylinder 56. The cylinder 56, in turn, is connected by a fluid passage 58 and an inlet port 60 to the motor 16. As a result of this arrangement, pressurized fluid from the inlet passage 52 flows to the motor 16 through the inlet cavity 54, the cylinder 56, the fluid passage 58, and the port 60.

A spool type, pilot operated valve 62 is slidably mounted for movement between a first position wherein it permits the flow of pressurized fluid from the inlet cavity 54 to the cylinder 56 and a second position wherein it prevents the flow of pressurized fluid from the inlet cavity 54 to the cylinder 56. The spool type valve 62 comprises a valve body 63 disposed in the cylinder 56 and a valve head 64, carrying a circumferential sealing ring 66, which extends into the inlet chamber 54 and is adapted to seat on a valve seat 68 when the spool type valve 62 is in its aforedescribed second or closed position. The spool type valve 62 is biased to its aforedescribed first or open position by a spring 70, located in the cylinder 56, such that the spool type valve 62 is normally maintained in its first or open position. The portion of the cylinder 56 containing the spring 70 is hereinafter termed a pilot chamber 71.

The valve head 64 is constructed to include a recess the walls of which, with the spool type valve 62 in its open position as illustrated in FIG. 1, cooperate with a wall 74 of the inlet cavity 54 to enclose a chamber 76. A restricted bore 78 communicates the chamber 76, through an axial bore 80 formed in the valve body 63, with the pilot chamber 71. A plurality of restricted, transverse bores 82 are provided in the valve body 63 for communicating the axial bore 80 with the portion of the cylinder 56 external to the pilot chamber 71. During the flow of pressurized fluid from the inlet passage 52 to the motor 16 through the cylinder 56, a portion of the pressurized fluid flows through the transverse bores 82 into the axial bore 80 from whence it passes into the chambers 71, 76. The recess in the valve head 64 is suitably constructed such that the pressurized fluid which is thus directed to the chambers 71, 76 exerts substantially equal, but opposing, biasing forces on the spool type valve 62.

A fluid passage 84 communicates the pilot chamber 71 with a chamber 86 defined by a pilot valve designated generally as 88. The pilot valve 88, as illustrated in FIGS. 1 and 2, comprises a plurality of stationary plates 90, 92 which are secured to each other and to the barrel 12 by mounting bolts 94.

Figure 2:
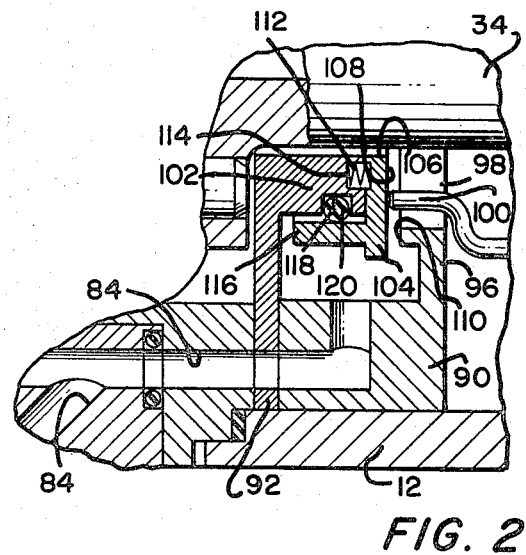
FIG. 2 is an enlarged fragmentary view of the embodiment of the invention illustrated in FIG. 1.

The stationary plate 90, as illustrated in FIGS. 1 and 2, circumferentially encloses the chamber 86 and includes an inwardly projecting, annular extension 96 which defines the forward end of the chamber 86. The annular extension 96 terminates in sufficiently spaced relationship to the spindle 34 to provide a relatively large diameter, annular fluid escape passage 98 which extends circumferentially around the spindle 34. The annular extension 96, furthermore, is positioned such that, as illustrated in FIG. 2, the extreme rearward end 100 of the rod 48 projects through the fluid escape passage 98 when the sleeve 36 moves a predetermined axial distance from the output spindle of the tool 10. The stationary plate 92, as illustrated in FIGS. 1 and 2, defines the rearward end of the chamber 86 and circumferentially receives the spindle 34 in a fit suitable to permit the spindle 34 to be rotatable relative to the stationary plate 92. The stationary plate 92, moreover, includes an annular extension 102, also circumferentially receiving the spindle 34 in a fit to permit independent rotation of the spindle 34, which projects forwardly towards the stationary plate 90 and terminates in spaced relationship to the annular extension 96 of the latter.

A generally annular, valving plate 104, including a central opening 106 of a diameter suitable to permit rotation of the spindle 34 independently of the valving plate 104, is disposed between the annular extension 96 of the stationary plate 90 and the extension 102 of the stationary plate 92. The valving plate 104 is movable between a closed position wherein its forward face 108 is located in sealing engagement adjacent its outer circumference with an annular valve seat 110 carried by the annular extension 96 and an open position, spaced from the valve seat 110, wherein fluid is permitted to escape from the chamber 86 through the fluid escape passage 98. The valving plate 104 is biased to its aforedescribed closed position by a plurality of arcuately arranged, coil springs 112 which are seated in cavities 114 formed in the forward face of the extension 102 of the stationary plate 92. The valve plate 104, moreover, includes a rearwardly extending, annular collar 116 which circumferentially surrounds the forward end of the extension 102 in spaced relationship thereto. A seal slot 118 is formed circumferentially around the forward end of the extension 102 and contains a seal ring 120 which prevents fluid leakage between the collar 116 and the extension 102.

During the operation of the aforedescribed embodiment of the invention, the spring 70 normally retains the spool type valve 62 in an open position and the springs 112 normally retain the valving plate 104 in a closed position. Thus, when the trigger 50 is actuated to cause pressurized fluid to flow through the inlet passage 52, the major portion of this pressurized fluid passes to the motor 16 through the inlet cavity 54, the cylinder 56, the fluid passage 58, and the port 60. A minor portion of the pressurized fluid flowing into the cylinder 56, however, passes through the transverse bores 82 into the axial bore 80 from whence it flows to the chamber 86, the fluid passage 84, the pilot chamber 71, and the chamber 76. The restricted bore 78 through which the pressurized fluid flows from the axial bore 80 to the chamber 76 is constructed of suitable dimensions to ensure that the chamber 76 does not fill with pressurized fluid before the pilot chamber 71 to prevent the pressurized fluid in the chamber 76 from closing the spool type valve 62 during this flow of the pressurized fluid. After the chambers 71, 76, 86, the fluid passage 84, and the bores 78, 80, 82 have been thus filled with pressurized fluid, all of the pressurized fluid flowing through the inlet passage 52 passes to the motor 16 through the inlet cavity 54, the cylinder 56, the fluid passage 58, and the port 60.

The latter described flow of all of the pressurized fluid to the motor 16 continues until the hammer 36 axially moves a distance sufficient to cause the rod 48 to engage the valving plate 104 and move the latter to an open position. This movement of the valving plate 104 to an open position substantially immediately exhausts the chamber 86, the fluid passage 84, and the pilot chamber 71 through the fluid escape passage 98. Thus, the pressurized fluid in the chamber 76 urges the spool type valve 62 away from the wall 74 whereupon the pressurized fluid in the inlet cavity 54 moves the spool type valve 62 to its closed position. The pressurized fluid exhausted from the chambers 71, 86 and the fluid passage 84, of course, flows to the atmosphere through an exhaust port (not shown) formed in the forward end of the barrel 12.

Figure 3:
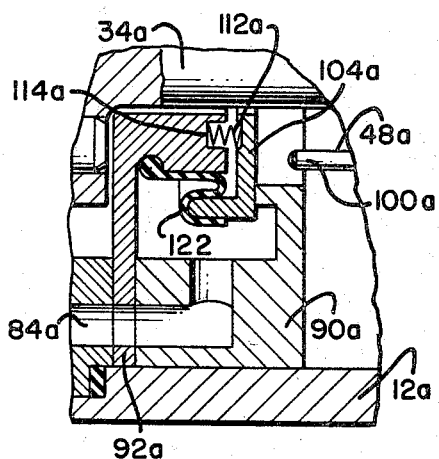
FIG. 3 is a view generally similar to that of FIG. 2, but illustrating a modified embodiment of the invention.

FIG. 3, wherein parts similar to those previously described are designated by the reference character for their previously described similar part followed by the suffix a, illustrates a modified embodiment of the present invention. This modified embodiment is different from the embodiment illustrated in FIGS. 1 and 2 only in that the seal ring 120 has been replaced by an annular diaphragm type seal 122.

The operation of this modified embodiment of the invention is believed to be apparent from the aforegoing description of the operation of the embodiment of the invention illustrated in FIGS. 1 and 2.

From the aforegoing, it will be seen that I have provided a new and improved apparatus for accomplishing all of the objects and advantages of my invention. It will be understood, however, that, although a preferred and an alternative embodiment of my invention have been illustrated and described in detail, my invention is not limited merely to these illustrated and described embodiments but contemplates other embodiments and variations which utilize the concepts and teachings of my invention.

Having thus described my invention, I claim:

1. In a fluid powered tool including a fluid operated motor and means for supplying pressurized fluid to the fluid operated motor, an apparatus for controlling the operation of the fluid operated motor, comprising:

pilot operated valve means movable between an open position permitting the flow of pressurized fluid to the fluid operated motor and a closed position preventing the flow of pressurized fluid to the fluid operated motor;

said pilot operated valve means being normally maintained in said open position;

means for causing said pilot operated valve means to be biased to said closed position;

chamber means for causing pressurized fluid to oppose said biasing means to prevent movement of said pilot operated valve means by said biasing means;

pilot valve means for controlling the pressurized fluid opposing said biasing means;

said pilot valve means comprising a plate member normally in a closed position wherein pressurized fluid is entrapped in said chamber means and movable to an open position wherein pressurized fluid is exhausted from said chamber means; and means operable in response to a predetermined operating condition of the fluid powered tool to move said plate member to its open position.

2. Apparatus according to claim 1, further comprising:

said plate member being of generally annular configuration.

3. An apparatus according to claim 2, further comprising:

means for biasing said plate member to its closed position.

4. An apparatus according to claim 3, further comprising:

seal means for preventing the escape of pressurized fluid by said plate member when said plate member is in its closed position.

5. An apparatus according to claim 1, further comprising:

said plate member being of generally annular configuration and, when in its closed position, being disposed in sealing engagement adjacent its outer circumference.

6. In a fluid powered tool including a fluid operated motor and passage means for supplying pressurized fluid to the fluid operated motor, an apparatus for controlling the operation of the fluid operated motor, comprising:

pilot operated valve means movable between a first position wherein pressurized fluid flows through said passage means to the fluid operated motor and a second position wherein the flow of pressurized fluid through said passage means to the fluid operated motor is prevented;

spring means for biasing said pilot operated valve means to said first position such that said pilot operated valve means is normally in said first position;

first chamber means connected to receive pressurized fluid for causing pressurized fluid to bias said pilot operated valve means against said spring means;

second chamber means connected to receive pressurized fluid for causing pressurized fluid to cooperate with said spring means to oppose the pressurized fluid in said first chamber means;

pilot valve means connected to said second chamber means for controlling the pressurized fluid in said second chamber means;

said pilot valve means comprising a generally annular plate member movable between a first position to entrap pressurized fluid in said second chamber means and a second position to exhaust pressurized fluid from said second chamber means;

means for biasing said plate member to its first position; and means operable in response to a predetermined operating condition of the fluid powered tool to move said plate member to its second position.

7. An apparatus according to claim 6, further comprising:

said means for biasing said plate member comprising spring means separate from said spring means for biasing said pilot operated valve means.

8. An apparatus according to claim 6, further comprising:
said plate member being disposed in a valve chamber separate from said second chamber; and
passage means for communicating said valve chamber with said second chamber.

9. An apparatus according to claim 6, further comprising:
said plate member, when in its first position, being in sealing engagement adjacent its outer circumference; and
seal means for preventing the escape of pressurized fluid by said plate member when the latter is in said first position.

10. An apparatus according to claim 9, further comprising:
said seal means comprising a ring seal; and
said means for biasing said plate member comprising a plurality of spaced springs.

11. An apparatus according to claim 9, further comprising:
said seal means comprising a diaphragm type seal; and
said means for biasing said plate member comprising a plurality of spaced springs.

References Cited

UNITED STATES PATENTS

| | | | |
|---|---|---|---|
| 3,174,559 | 3/1965 | Vaughn | 173—12 |
| 3,174,606 | 3/1965 | Hornschuch et al. | 192—150 |
| 3,220,525 | 11/1965 | Pauley | 192—150 |

ERNEST R. PURSER, *Primary Examiner.*